US010430186B2

United States Patent
Calciu et al.

(10) Patent No.: US 10,430,186 B2
(45) Date of Patent: Oct. 1, 2019

(54) SPEEDING UP TRANSACTIONS IN NON-VOLATILE MEMORY USING HARDWARE TRANSACTIONAL MEMORY

(71) Applicant: VMware, Inc., Palo Alto, CA (US)

(72) Inventors: Irina Calciu, Palo Alto, CA (US);
Jayneel Gandhi, Palo Alto, CA (US);
Pradeep Fernando, Atlanta, GA (US);
Aasheesh Kolli, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 32 days.

(21) Appl. No.: 15/796,635

(22) Filed: Oct. 27, 2017

(65) Prior Publication Data
US 2019/0129716 A1 May 2, 2019

(51) Int. Cl.
*G06F 3/06* (2006.01)
*G06F 9/30* (2018.01)
*G06F 11/14* (2006.01)
*G06F 12/0804* (2016.01)
*G06F 12/0868* (2016.01)
*G06F 9/46* (2006.01)

(52) U.S. Cl.
CPC ........ *G06F 9/3004* (2013.01); *G06F 9/30087* (2013.01); *G06F 9/466* (2013.01); *G06F 11/1471* (2013.01); *G06F 12/0804* (2013.01); *G06F 12/0868* (2013.01); *G06F 3/067* (2013.01)

(58) Field of Classification Search
None
See application file for complete search history.

(56) References Cited

U.S. PATENT DOCUMENTS

2018/0143850 A1* 5/2018 Avni .................... G06F 9/467

OTHER PUBLICATIONS

Wang et al., "Persistent Transactional Memory," IEEE Computer Architecture, 1:14, Jan-Jun. 2015, pp. 58-61.
Liu et al., "DUDE™: Building Durable Tranactions with Decoupling for Persistent Memory," ASPLOS '17, Apr. 8012, 2017, Xi-an, China, 15 pgs.
Giles et al., "Brief Announcement: Hardware Transactional Storage Class Memory," SPAA'17, Jul. 24-26, 2017, Washington, DC, 4 pgs.
Volos et al., "Mnemosyne: Lightweight Persistent Memory," ASPLOS'11, Mar. 5-11, 2011, Newport Beach, CA, 13 pgs.

(Continued)

*Primary Examiner* — Brian R Peugh
(74) *Attorney, Agent, or Firm* — Patterson + Sheridan, LLP (57) ABSTRACT

The disclosure provides an approach for atomically executing computer instructions by a CPU of a computing device comprising non-volatile memory, the CPU configured to implement hardware transactional memory (HTM). The approach generally includes reading an instruction within a section of code designated as an HTM transaction, determining whether the instruction causes a data conflict with another thread, and copying cache lines from memory into a cache of the CPU. The approach further includes marking the copied cache lines as transactional, processing the instruction to create a persistent log within non-volatile memory, and unmarking the copied cache lines from transactional, to non-transactional.

20 Claims, 6 Drawing Sheets

(56) References Cited

OTHER PUBLICATIONS

Pu et al., "Non-intrusive Persistence with a Backend NVM Controller," IEEE Computer Architecture Letters, vol. XX, No. Y, 2015, 4 pgs.
Joshi et al., "ATOM: Atomic Durability in Non-volatile Memory through Hardware Logging," HPCA2017, HPCA Conference, 2017 IEEE International Symposium on High Performance Computer Architecture, University of Edinburgh, Feb. 2017, 12 pgs.
Intel, "Architecture instruction set extensions programming reference," Aug. 2015, https://software.intel.com/sites/default/files/managed/07/b7/319433-023.pdf.
Giles et al., "Continuous Checkpointing of HTM Transactions in NVM," ISMM 2017, Barcelona, Spain, 16 pgs.
Avni et al., Hardware Transactions in Nonvolatile Memory,: DISC 2015, Oct. 2015, Tokyo, Japan, 17 pgs.

* cited by examiner

SPEEDING UP TRANSACTIONS IN NON-VOLATILE MEMORY USING HARDWARE TRANSACTIONAL MEMORY

BACKGROUND

Computer software is often used to create systems that need to remain in "consistent" states. For example, computer software may implement a banking system that is composed of bank accounts. When a money transfer occurs from one bank account to another, the total amount of funds in the two accounts must remain equal before and after the transfer. Otherwise, something went wrong during the transfer and the banking system becomes inconsistent. In regards to a money transfer, the banking system would be considered consistent before the transfer is initiated or after the transfer successfully completes, and not during intermediate steps during the transfer process. That is, all steps of the money transfer—first debiting from the source account and second crediting to the destination account—must be completed, or none of the steps must be completed, for the banking system to remain in a consistent state.

A system is considered "consistent" if it maintains a predefined variant property for that system, as pertaining to a transaction. For a money transfer in a banking system, the variant property is that the total funds of source and destination accounts remain the same before and after the money transfer. One cause that may lead a system to be in an inconsistent, intermediate state is a power failure in the course of a transaction.

A sequence of steps that must all occur or none occur is referred in the art a "transaction," because similarly to a banking transaction, these steps have consistent initial and final steps, but inconsistent intermediate steps. A sequence of steps that must all occur or none occur is also referred in the art as a sequence of steps that must occur "atomically." Thus, the terms "atomic" and "transaction" are herein used to indicate the same concepts and will be used synonymously within the present disclosure.

Recently, devices that use non-volatile memory (NVM) have begun to see increased usage. Memory is where programs and data are kept when the processor is actively using them. Volatile or non-persistent memory is memory that needs constant power in order to prevent data from being erased. Volatile memory describes conventional memory, such as dynamic random access memory (DRAM). NVM is memory that is persistent (non-volatile). Non-volatile memory is memory that retains its data after having power cycled (turned off and then back on). Non-volatile memory is byte-addressable, random access non-volatile memory.

NVM presents new challenges in maintaining consistency of systems when transactions are interrupted, such as by power failures. One challenge is that the system may have been stored in NVM in an inconsistent state at the time of power loss, and when the power returns, the system is unable to continue from the precise point it left off. A second challenge is that caches used along with NVM are usually volatile. Changes to data within a cache need to be flushed to NVM for them to be recorded within memory. To flush data from a cache to memory means to copy contents of cache lines containing that data into memory, and then to evict those cache lines from the cache. Power loss may occur after changes were made but before some changes were flushed, resulting in a loss of data. The loss of data may leave the system in an inconsistent state.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
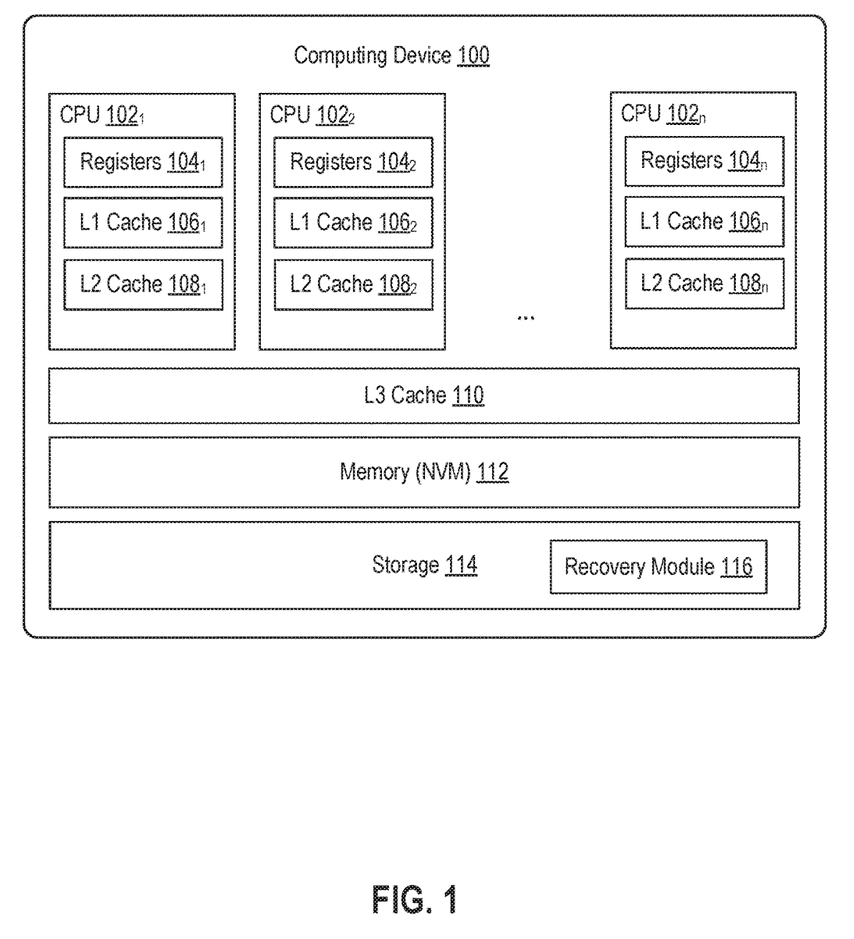
FIG. 1 is a block diagram of a computing device 100 in which one or more embodiments of the present disclosure may be utilized.

FIG. 1 is a block diagram of a computing device 100 in which one or more embodiments of the present disclosure may be utilized. Computing device 100 includes one or more central processing units (CPUs) $102_1$ to $102_n$ (collectively referred to as CPUs 102 or individually referred to as CPU 102). Each CPU 102 is configured to execute instructions, for example, executable instructions that perform one or more operations described herein and may be stored in non-volatile memory 112 and/or in storage 114.

CPU 102 includes processor registers 104. A processor register is a quickly accessible location available to CPU 102, consisting of a small amount of fast storage. A register is usually large enough to hold an instruction. For example, in a 64-bit computer, a register may be 64 bits in length. Registers 104 are private to their respective CPU 102 and are not accessible to other CPUs. For example, registers $104_1$ are accessible to CPU $102_1$, but not accessible to CPUs $102_2$-$102_n$.

CPU 102 includes one or more caches, 106, 108. As depicted in FIG. 1, CPU 102 contains two caches. L1 cache 106 and L2 cache 108. However, CPU 102 may only contain a single cache, or may contain more than two caches, depending on the design of CPU 102. Caches L1 and L2 are private to their respective CPU 102 and are not accessible to other CPUs. For example, L1 cache $106_1$ and L2 cache $108_1$ are accessible to CPU $102_1$, but not accessible to CPUs $102_2$-$102_n$. L1 cache 106 is typically smaller in size than L2 cache 108.

Computing device 100 includes a shared cache, L3 cache 110. L3 cache 110 is accessible to all CPUs $102_1$ to $102_n$. L3 cache 110 is typically larger in size than L2 cache 108. As in known in the art, the "L" in L1, L2, L3 stands for "level." FIG. 1 illustrates a cache hierarchy in that L1 cache 106 is a cache of L2 cache 108, which is a cache of L3 cache 110. FIG. 1 further illustrates a storage-memory-cache hierarchy in that L3 cache 110 is a cache of memory 112, and memory 112 is a cache of storage 114.

Computing device 100 also includes memory 112. As described herein memory 112 is non-volatile memory and is herein also referred to as non-volatile memory (NVM) 112. NVM 112 is memory that is persistent and retains its data after having power cycled (turned off and then back on). Although computing device 100 is not shown to include volatile memory, it is contemplated that computing device 100 may include volatile memory (not shown) in addition to NVM 112. As known in the art, data is brought from NVM 112 into caches, 106, 108, 110, by bringing a copy of a cache line containing that data from NVM 112 into the target cache, 106, 108, and/or 110.

Computing device 100 includes storage 114. Storage 114 represents local persistent storage devices (e.g., one or more hard disks, flash memory modules, solid state disks, and optical disks). Storage 114 is typically slower than NVM 112 and is typically larger in size than NVM 112. As known in the art, data from storage 114 is brought into NVM 112 by paging memory pages from storage 114 into NVM 112.

NVM 112 includes recovery module 116. Recovery module 116 is a software program that executes after computing device 100 is shut down improperly, such as after a power failure. Recovery module 116 may be executed on one or more of the CPUs 102. In certain embodiments, recovery module 116 may instead be stored in storage 114.

The following is an example of how data stored in NVM 112 can be modified using a traditional cacheable store including L1 cache 106 (e.g., as well as L2 cache 108 and L3 cache 110). For example, a variable X may be stored in NVM 112. Code may be executed by CPU 102 to modify the value of X, such as an instruction of X=5. In order to modify X, the cache line in which the current value of X is stored in NVM 112 may be brought into L1 cache 106 (e.g., as well as L2 cache 108 and L3 cache 110). The value of X may then be modified in place in the L1 cache 106. However, the value of X may not be persistent in this state as it may only be modified in one or more of L1 cache 106, L2 cache 108, and L3 cache 110 and not yet persisted and stored in NVM 112. In order to ensure that the value of X is persisted and stored in NVM 112, the following pseudo code may be executed by CPU 102:

X=5;
Flush X;
SFENCE;

A "flush" instruction (e.g., operation) may ensure that the contents of a cache are stored in NVM 112 and evicted from the cache. A flush instruction, in certain examples, may correspond to one of a CLFLUSH, CLFLUSHOPT, or CLWB instruction as provided by the x86 instruction set architecture (ISA). Some flush instructions may have weak ordering, meaning the order in which instructions in code are performed may not be guaranteed. Accordingly, an ordering instruction (e.g., SFENCE) may be used to ensure proper ordering. In particular, any instructions before the ordering instruction may be performed before any additional instructions after the ordering instruction are performed.

For example, to ensure that a variable X is modified and persisted to NVM 112 before another variable Y is modified, the following pseudo code may be executed by CPU 102:

X=5;
Flush X;
SFENCE;
Y=10;

In certain cases, as discussed, atomicity of instructions may be necessary, such as in the banking transaction example. To guarantee such atomicity of instructions, the code for executing such instructions may need to be explicitly identified as failure-atomic sections, such as by using a predefined application programming interface (API). For example, to ensure that both a variable A and B stored in NVM 112 are modified and persisted to NVM 112 or neither is modified in NVM 112, the following pseudo code may be executed by CPU 102:

FAILURE-ATOMIC-SECTION-START( );
A=A−100;
B=B+100;
FAILURE-ATOMIC-SECTION-END( );

Any instructions between the FAILURE-ATOMIC-SECTION-START( ) and FAILURE-ATOMIC-SECTION-END( ) instructions may be guaranteed to be performed atomically.

In certain aspects, atomicity of instructions may be guaranteed using mechanisms such as redo logs and undo logs. A log may be a data structure stored in NVM 112 and/or storage 114. The log may include entries that indicate an address in memory (e.g., NVM 112) and a value associated with the address (e.g., as an entry <address, value>). The log may be stored separately from the actual value stored at the actual address in memory.

Redo logs allow a system to log (or record) the new value of a variable in a log without changing the value of the variable itself at the address in NVM 112. Once all the variables within a transaction have been logged (their new values recorded in the log), the system may proceed to change the value of the actual variables at the addresses they are stored within NVM 112. If a power failure occurs while variables are being logged, then the system simply remains at its original, unchanged consistent state. If power failure occurs after the variables have been logged, then the system has the option to "redo" the variable assignments by accessing the log and assigning new values to variables at the addresses they are stored within NVM 112, which would bring the system to a resulting consistent state. In both situations, the system would remain in a consistent state—either pre-assignment or post assignment consistent states.

For example, to ensure that both a variable A and B are modified atomically in NVM 112, the following pseudo code implementing a redo log may be executed by CPU 102:

FAILURE-ATOMIC-SECTION-START( )
Insert Entry1=<Address(A), New-Value(A)>into redo log;
Flush Entry1 from caches;
Insert Entry2=<Address(B), New-Value(B)>into redo log;
Flush Entry2 from caches;
SFENCE;
Insert Entry3=COMMIT into redo log;
Flush Entry3;
SFENCE;
A=A−100;
B=B+100;
FAILURE-ATOMIC-SECTION-END( );

The Insert Entry 1 instruction inserts the new value of the instruction A=A−100 into a redo log in a cache (e.g., L1 cache 106). The Flush Entry 1 instruction flushes the log entry for A to the log stored in NVM 112. The Insert Entry 2 instruction inserts the new value of the instruction B=B+100 into the redo log in the cache (e.g., L1 cache 106). The Flush Entry 2 instruction flushes the log entry for A to the log stored in NVM 112.

In case of a failure before the first SFENCE instruction, after the Flush Entry 2 instruction, recovery module 116 may throw away the redo log, since it is guaranteed that none of the variables A and B have been modified at their actual address locations in NVM 112. However, if a failure happens after the first SFENCE instruction, recovery module 116 may not know if the variables A and B have been modified at their actual address locations in NVM 112. Recovery module 116, however, can update the values of the variables A and B at their actual address locations in NVM 112 using the new values saved in the redo log. However, recovery module 116 may not be able to differentiate between whether the failure occurred before or after the SFENCE instruction. Accordingly, the Insert Entry 3 command inserts a COMMIT entry in the redo log indicating that all entries in the redo log have been inserted for the transaction. If there is a failure, and no COMMIT in the redo log, recovery module 116 discards the redo log. If there is a failure, and a COMMIT in the redo log, recovery module 116 updates the values of the variables A and B at their actual address locations in NVM 112 using the new values saved in the redo log.

Undo logs are similar to redo logs, but allow a system to log (or record) the old value of a variable in a log, rather than the new value. Once all the variables within a transaction have been logged (their old values recorded in the log), the system may proceed to change the value of the actual variables at the addresses they are stored within NVM 112. If a power failure occurs while variables are being logged, then the system simply remains at its original, unchanged consistent state. If power failure occurs after the variables have been logged and some variables have been changed, then the system has the option to "undo" the variable assignments by accessing the log and assigning old values to variables at the addresses they are stored within NVM 112, which would bring the system back to the original, unchanged consistent state. In both situations, the system would remain in a consistent state—the pre-assignment consistent state.

For example, to ensure that both variable A and B are modified atomically in NVM 112, the following pseudo code implementing an undo log may be executed by CPU 102:

FAILURE-ATOMIC-SECTION-START( );
Insert Entry 1=<Address(A), Old-Value(A)>into undo log;
Flush Entry1 from caches;
SFENCE;
A=A−100;
Insert Entry2=<Address(B), Old-Value(B)>into undo log;
Flush Entry2 from caches;
SFENCE;
B=B+100;
Insert Entry3=COMMIT into undo log;
Flush Entry3;
SFENCE;
FAILURE-ATOMIC-SECTION-END( );

The Insert Entry 1 instruction inserts the current, old value of A into an undo log within a cache (e.g., L1 cache 106). The Flush Entry 1 instruction flushes the log entry for A to the log stored in NVM 112. The value of A at its actual address location in NVM 112 is then modified. The Insert Entry 2 instruction inserts the current old value of B into an undo log in a cache (e.g., L1 cache 106). The Flush Entry 2 instruction flushes the log entry for B to the log stored in NVM 112. The value of B at its actual address location in NVM 112 is then modified. A COMMIT flag is then inserted into the undo log. If there is a failure, recovery module 116 uses the undo log to recover old values of variables A and B, whether or not a COMMIT flag had been inserted into the undo log within NVM 112. This is because both an undo log will contain correct pre-assignment values of variables, whether or not the transaction completed. And the variables that were not logged will still have their pre-assigned values. So the system as a whole (in this example, variables A and B) will be in a pre-assignment consistent state by reverting to any logged entry values present within an undo log. Such a recovery may be necessary because variables A and B themselves are not flushed (persisted) during the failure atomic section, but rather, remain in the cache (e.g., L1 cache 106), and are flushed into NVM 112 at a later time, as per the cache write policy (write-through, write-back, etc.). As used herein, "failure atomic" refers to a section of code that is atomic (a sequence of steps that must all occur or none occur) and that is implemented in a way that is designed to maintain consistency of NVM 112 if a power failure occurs during the course of execution of the atomic code section.

In the context of an undo log, a COMMIT flag may also assist in pruning of the undo log. If an undo log grows large and a power failure occurs, a lot of work may be lost due to "undoing" through the undo log, by recovery module 116. To prevent a large loss of work, transactions may be removed (pruned) from an undo log after cache lines containing data for the transaction have been flushed to NVM 112.

Undo logs need the old value to be inserted in the log before every store and this data needs to be guaranteed to be durable (flushed to NVM 112) before a variable stored in NVM 112 is modified. This means a flush and SFENCE are required every time a variable is changed, either within a cache (e.g., L1 cache 106) or within NVM 112. This is in contrast to redo logs, which can have just one SFENCE for all log entries and flushes. Thus, writes are expensive (e.g., in terms of time/latency) when using undo logs.

For redo logs, reads may be expensive because the new values of variables are only written to the actual address locations in NVM 112 after being written to the redo log. Accordingly, if the new value of a variable needs to be read for an operation during the course of the transaction, the read may need to be redirected to the value stored in the redo log, which may increase latency and complexity of the code in the redirection.

CPU 102 is further configured to support hardware transactional memory (HTM). HTM is not a type of memory, but rather, a way of organizing interactions between memory 112 and caches L1, L2, and L3 for sections of code designated as transactional. HTM is also a way of organizing interactions between threads, specifically, synchronization in the context of concurrent and parallel programming. That is, any section of code designated as transactional by the HTM's API can be executed by only one thread at a time if a conflict exists between the threads. A "conflict" is further described below with reference to FIG. 2. A "thread" in computer science is short for a thread of execution. Threads are a way for a program to divide itself into two or more simultaneously running tasks. Threads may share same resources, such as caches, memory, and CPU cycles.

Some existing commercial HTM processors include Intel's Haswell-based processors and newer, IBM POWERS, and IBM's zEnterprise EC12 and Blue Gene/Q. Processors configured for HTM come with an application programming interface (API) that allows the programmer, for example, to designate a start and end of a transactional code section with explicit instructions. An example of an API that adds hardware transactional memory support is Intel's Transactional Synchronization Extensions (TSX), which is an extension to the x86 instruction set architecture (ISA).

A primary purpose of HTM is for thread synchronization. It is a hardware implementation of thread synchronization, making concurrent and parallel programming faster and simpler. But HTM can also be leveraged for failure atomic code. That is, HTM is already configured to execute transactions, but not in a way that is tailored for ensuring consistency of systems, such as a bank account system, within NVM 112 in the event of a power failure. CPU 102 may be further configured to allow for persistent logging during the course of a failure atomic transaction. The term "persistent logging" means to create a log entry within NVM 112 as opposed to within a cache (e.g., L1 cache 106). As stated above, a "failure atomic" is a section of code that is atomic (a sequence of steps that must all occur or none occur) and that is implemented in a way that is designed to maintain consistency of NVM 112 if a power failure occurs during the course of execution of the atomic code section.

Currently, conventional implementations of HTM prevent persistent logging while an HTM transaction is executing. Conventionally, an HTM-configured processor, such as CPU 102, makes sure that (1) all data modified within an HTM transaction is written only to cache lines within the cache (e.g., L1 cache 106) and not directly to NVM 112, and (2) transactional cache lines within the cache (e.g., L1 cache 106) are not evicted from the cache during an HTM transaction, and are not flushed from the cache to NVM 112 during an HTM transaction. If either (1) or (2) occurs, CPU 102 aborts the transaction for that thread.

Implementing undo and redo logs with HTM may not be possible using conventional techniques because HTM-configured processors mark cache lines used for a transaction as transactional in the cache (e.g., L1 cache 106), and these processors prevent flushing of transactional cache lines to NVM 112 during execution of the HTM transaction. Additionally, HTM is implemented on CPU 102 such that bypassing all of the caches (L1 cache 106, L2 cache 108, and L3 cache 110) and working directly in memory 112 causes the transaction to abort. Thus, HTM must be modified in order for redo and undo logs to be implemented within an HTM transaction.

If CPU 102 attempts to bypass the cache (e.g., L1 cache 106) and to write directly to NVM 112, or if CPU 102 evicts or flushes a transactional cache line, then CPU 102 forces the thread executing the HTM transaction to abort. Upon an abort, CPU 102 rewinds the code and memory operations back to the line of code before the HTM transaction, thus rewinding the state of the system back to its initial pre-transaction consistent state. To restate simply, the transactional cache lines in L1 cache 106 can be thought of as a side stash where a thread brings in copy of data from NVM 112, modifies it, and when HTM transaction finishes, CPU 102 releases that copy for other threads to modify.

As discussed, implementing a redo or undo log requires writing log entries to NVM 112 during an HTM transaction. Also, writing to NVM 112 during an HTM transaction aborts that transaction. In order to implement a redo or undo log using HTM, and thus implement a failure atomic transaction within HTM, CPU 102 may be modified to either (1) allow non-temporal log writes, or (2) allow flushing of log writes to NVM 112. As used herein, a "non-temporal" write is a write operation that bypasses the cache (i.e., bypasses L1 cache 106, L2 cache 108, and L3 cache 110) and writes directly to NVM 112. Allowing non-temporal writes and flushing of log writes, as opposed to of any or of all writes (e.g., non-log writes), would not interfere with the functioning of an HTM processor. This is because a log write (or log entry) would not be accessed by a thread other than the thread that created that log write during execution of an HTM transaction. Thus, there is no risk of data conflict when making log write data accessible to other threads in the course of an HTM transaction.

Different mechanisms may be used to modify CPU 102 to allow non-temporal writes to NVM 112. One mechanism is to modify CPU 102 at the hardware level to automatically convert all log write instructions within a failure atomic section (failure atomic transaction) to non-temporal log writes. Another mechanism is for CPU 102 to recognize all write instructions, and before executing a write instruction, creating a non-temporal log entry for data modified by the write. This would ensure a log entry before modification of data in the cache (e.g., L1 cache 106), allowing restoration of a consistent state in the case of a power failure. A third mechanism is programmer controlled. The third mechanism is to create a custom Instruction Set Architecture (ISA) instruction that performs a non-temporal write, and to modify CPU 102 at the hardware level to allow a non-temporal write within a failure atomic transaction. These mechanisms are further discussed below with reference to FIGS. 3A, 3B, and 3C.

A mechanism may be used to modify CPU 102 to allow flushing of log writes to NVM 112. That mechanism is to modify CPU 102 at the hardware level to recognize all log flush instructions and then to allow the log flush instructions to execute within a failure atomic section or transaction. This mechanism is further discussed below with reference to FIG. 3D.

Figure 2:
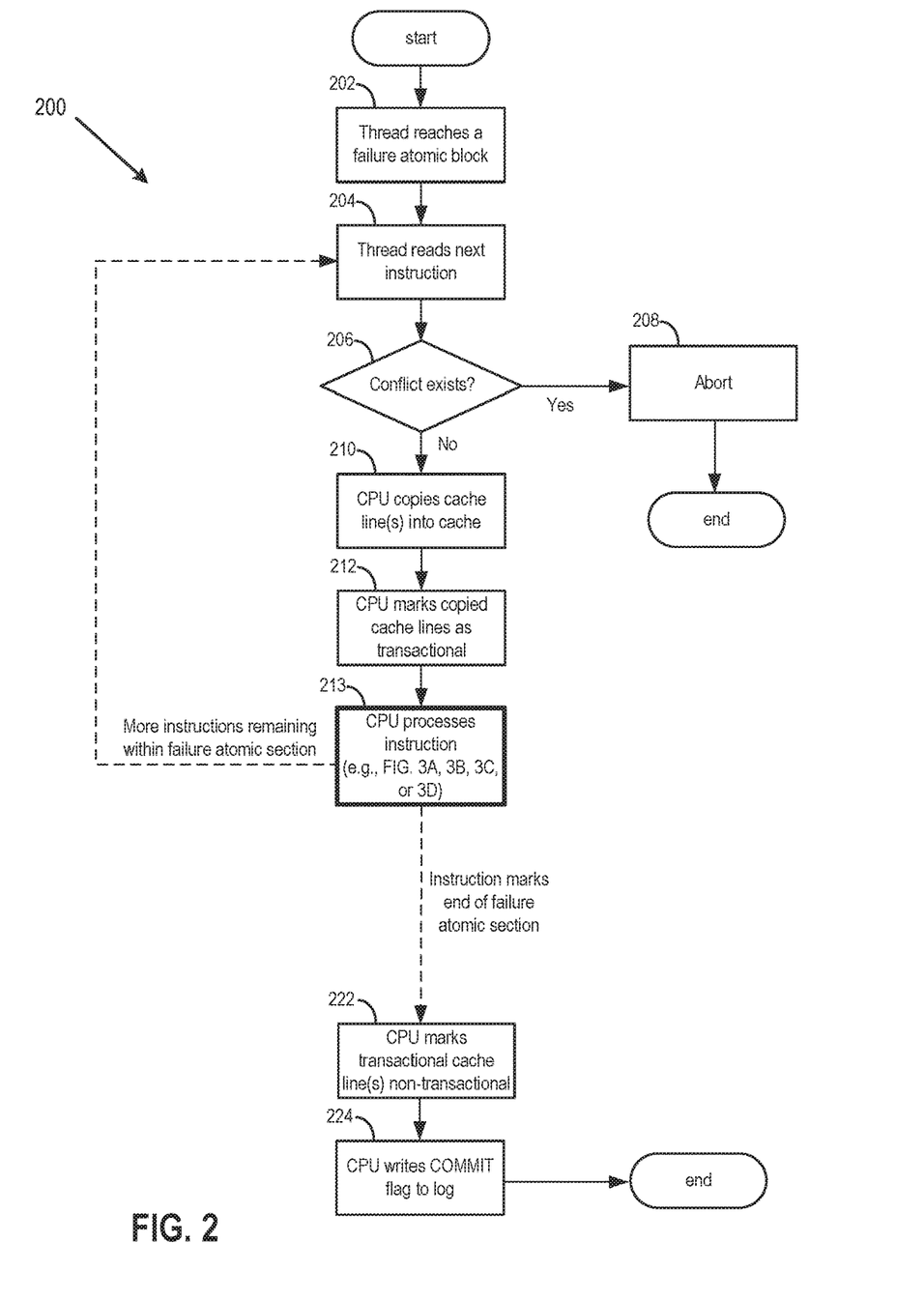
FIG. 2 depicts a flow diagram of a method of executing a failure atomic code block.

FIG. 2 depicts a flow diagram of a method 200 of executing a sequence of computer instructions that must all be executed or none be executed, the method implemented to maintain consistency of systems within NVM 112 in case a power failure occurs during execution of the sequence of computer instructions. Method 200 is executed by a single thread running on CPU 102. CPU 102 is configured for hardware transactional memory transactions, and further configured for either non-temporal log writes to NVM 112 or for flushing of log writes to NVM 112.

At block 202, a thread reaches a failure atomic section of code implementing a transaction by using the HTM system of CPU 102. Conventionally, an HTM section of code may be indicated by a start instruction such as xbegin, which is provided by the x86 ISA and may be used with Intel's TSX. However, in block 202, the start of a failure atomic section is indicated by a custom ISA start instruction, for example, PTXBEGIN. The custom start instruction indicates to CPU 102 that the following section of code uses HTM, and additionally has exceptions or additional configurations to the conventional functioning of HTM. Additional configurations to HTM for method 200 are discussed below with reference to FIGS. 3A, 3B, 3C, 3D. Any appropriate API may be used to indicate the start of a failure atomic code section, depending on CPU 102 and the particular HTM implemented on CPU 102.

At block 204, the thread reads the next instruction within the failure atomic code section, and at block 206, the thread decides whether a conflict exists between its execution of the instruction from block 204 and a second thread's execution of an instruction. A second thread's code may be using data that overlaps with data needed for execution of the instruction from block 204 of the failure atomic code section. CPU 102 checks whether data needed by the thread executing the instruction from block 204 is currently being used by another thread. CPU 102 may do this, for example, by checking whether cache lines containing data needed for failure atomic code instruction are being modified by another thread. If another thread is only reading the same cache line addresses, not modifying (writing), then there is no conflict and both threads are able to proceed. If one or both of the threads is writing to cache line(s) that contain data needed by the instruction of block 204, then a conflict exists. If a conflict between threads exists, method 200 proceeds to block 208. If a conflict does not exist, method 200 proceeds to block 210.

At block 208, either the thread executing method 200 aborts, or the other thread with which a conflict exists aborts. If the thread executing process 200 aborts, that thread may wait and try executing method 200 again later, or the thread may execute code in an "else" section of code specifying instructions upon abort, or another action may occur, as decided by the programmer implementing HTM and/or method 200. Upon an abort, the HTM system of CPU 102 rewinds all cache and memory operations of method 200 back to block 202. This rewinds the state of the system back to its initial pre-transaction consistent state. All memory operations in an aborted transaction appear to other threads to have never happened.

At block 210, the thread executing method 200 proceeds with executing the transaction of the failure atomic code section. At block 210, CPU 102 copies cache line(s) containing data needed for the instruction of block 204 from NVM 112 into the cache (e.g., L1 cache 106) of the particular CPU 102 within which the cache is located. That is, if the thread executing method 200 is on CPU 102$_1$, then the cache lines are copied into L1 cache 106$_1$.

At block 212, CPU 102 marks copied cache line(s) in block 210 as transactional. Cache line(s) may be marked transactional by changing a transaction bit within a cache line from a zero to a one.

At block 213, CPU 102 processes the instruction read in block 204, unless that instruction marks the end of the failure atomic code section, in which case the instruction is processed in blocks 222 and 224. Block 213 may be executed in various ways, as decided by a hardware designer and/or programmer. Four embodiments of block 213 are depicted by FIG. 3A, 3B, 3C, or 3D, each of which are discussed in turn, below. The methods of FIGS. 3A, 3B, 3C, and 3D differ from each other by blocks 314 and 316. Otherwise, the blocks of the methods are similar. The below discussions of FIGS. 3A, 3B, 3C, and 3D mention log entries. Either undo or redo log entries would work for these methods.

Figure 3A:
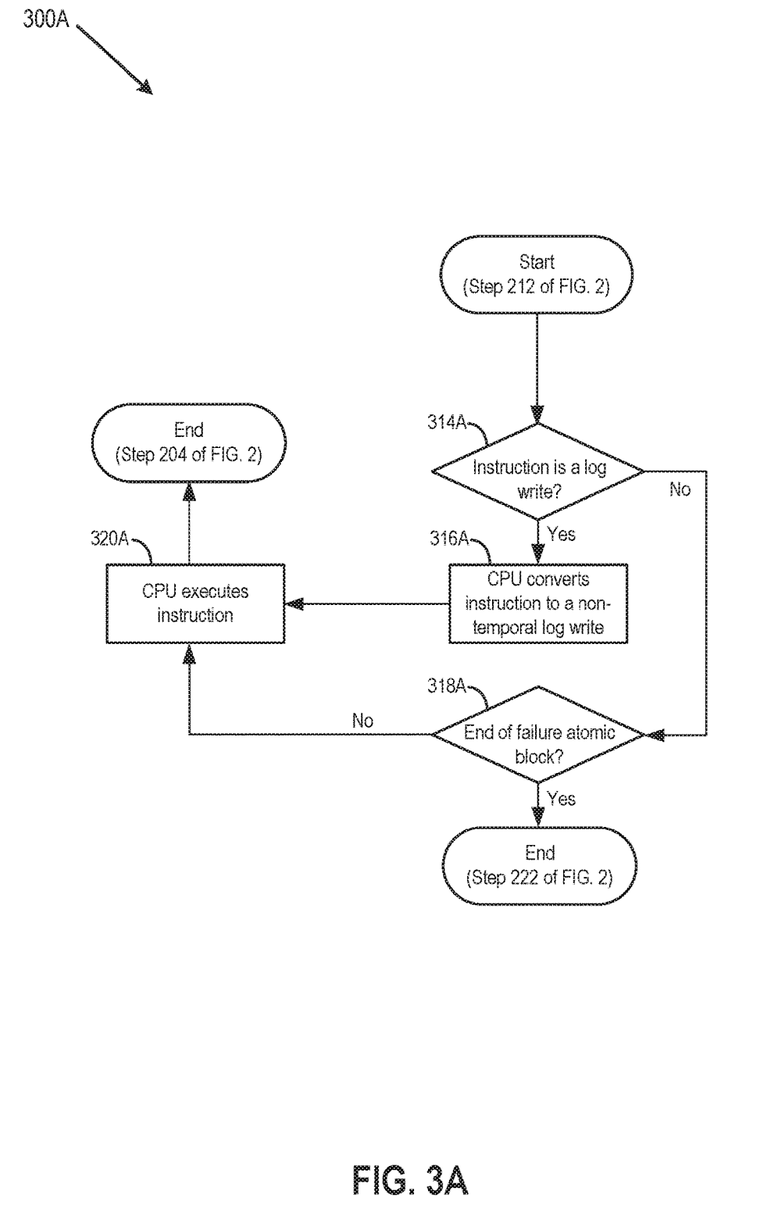
FIG. 3A is a flow diagram a depicting method of processing a non-terminating instruction within a failure atomic code block, in a first embodiment.

FIG. 3A is a flow diagram depicting method 300A, which is an embodiment of processing a non-terminating instruction within a failure atomic code section. A "non-terminating" instruction is an instruction that does not indicate the end of a failure atomic code section, such as for example, an instruction analogous to an "xend" instruction of Intel's x86 ISA. Method 300A of FIG. 3A assumes that the hardware of CPU 102 is configured to recognize all log entry instruction within a failure atomic code section, and then rather than writing the log entry into a cache line that has been copied into the cache (e.g., L1 cache 106), CPU 106 writes the log entry directly to NVM 112, bypassing L1 cache 106, L2 cache 108, L3 cache 110, and any other caches that may be in the cache-memory hierarchy.

At block 314A of method 300A, CPU 102 analyzes the instruction to determine whether the instruction is a log entry instruction intended to write to a log. If so, method 300A continues to block 316A. If the instruction is not a log entry instruction, then method 300A continues to block 318A.

At block 316A, CPU 102 automatically converts the instruction from block 204 of FIG. 2 into a non-temporal log write instruction. In block 320A, the non-temporal log write instruction writes the log entry to NVM 112, bypassing all caches, 106, 108, 110. Usually, bypassing the cache is not permitted by HTM processors because of potential conflicts, but log entries by a given thread would not be accessed by another thread during the execution of an failure atomic code section, so there is no risk of conflict in such a configuration of CPU 102. After block 320A of method 300A, method 200 returns to block 204 of method 200 of FIG. 2.

At block 318A, method 300A determines whether the instruction is an instruction indicating the end of a failure atomic code section, such as an instruction analogous to an "xend" instruction of x86 ISA. If the instruction is not an instruction indicating the end of the failure atomic code section, then method 300A continues to block 320A, where the instruction is executed as usual, and method 200 returns to block 204 of FIG. 2. If the instruction is an instruction indicating the end of the failure atomic code section, then method 300A continues to block 222 of FIG. 2, where blocks 222 and 224 close out the failure atomic code section, as further described below with reference to FIG. 2.

Figure 3B:
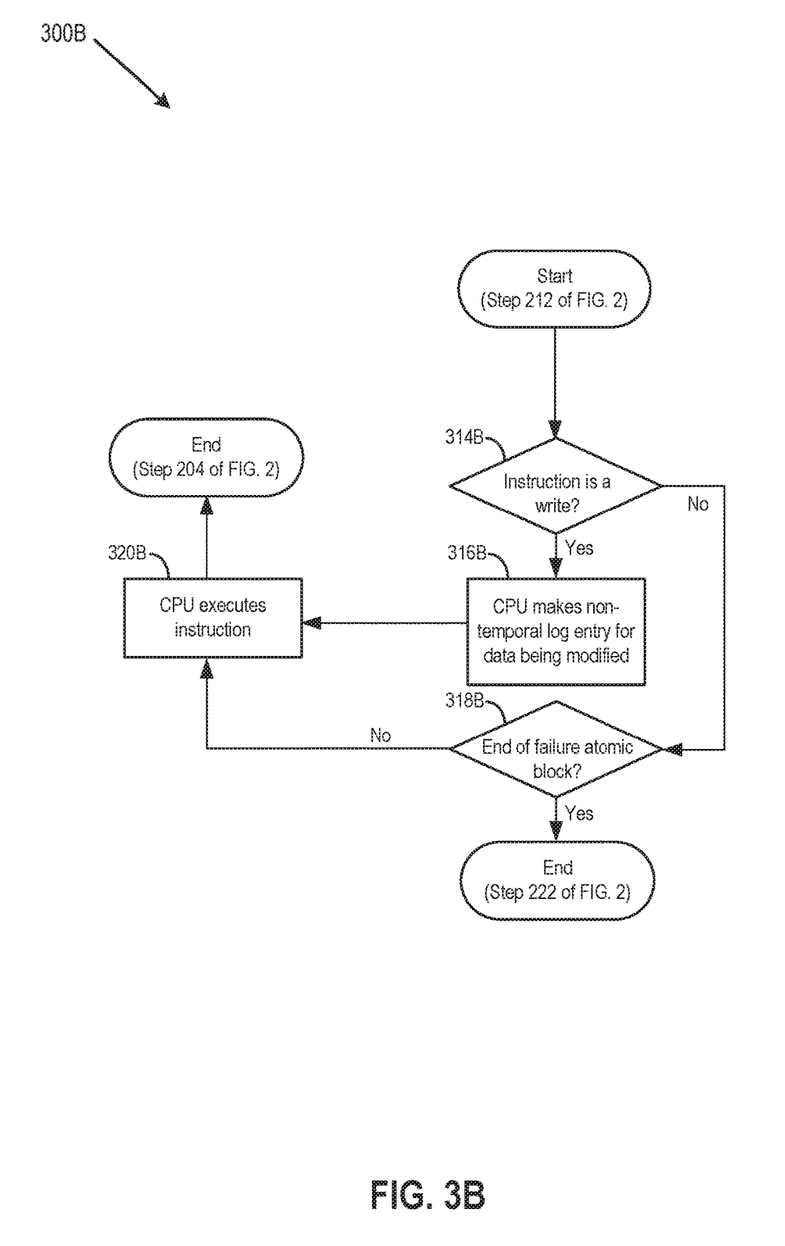
FIG. 3B is a flow diagram a depicting method of processing a non-terminating instruction within a failure atomic code block, in a second embodiment.
Figure 3C:
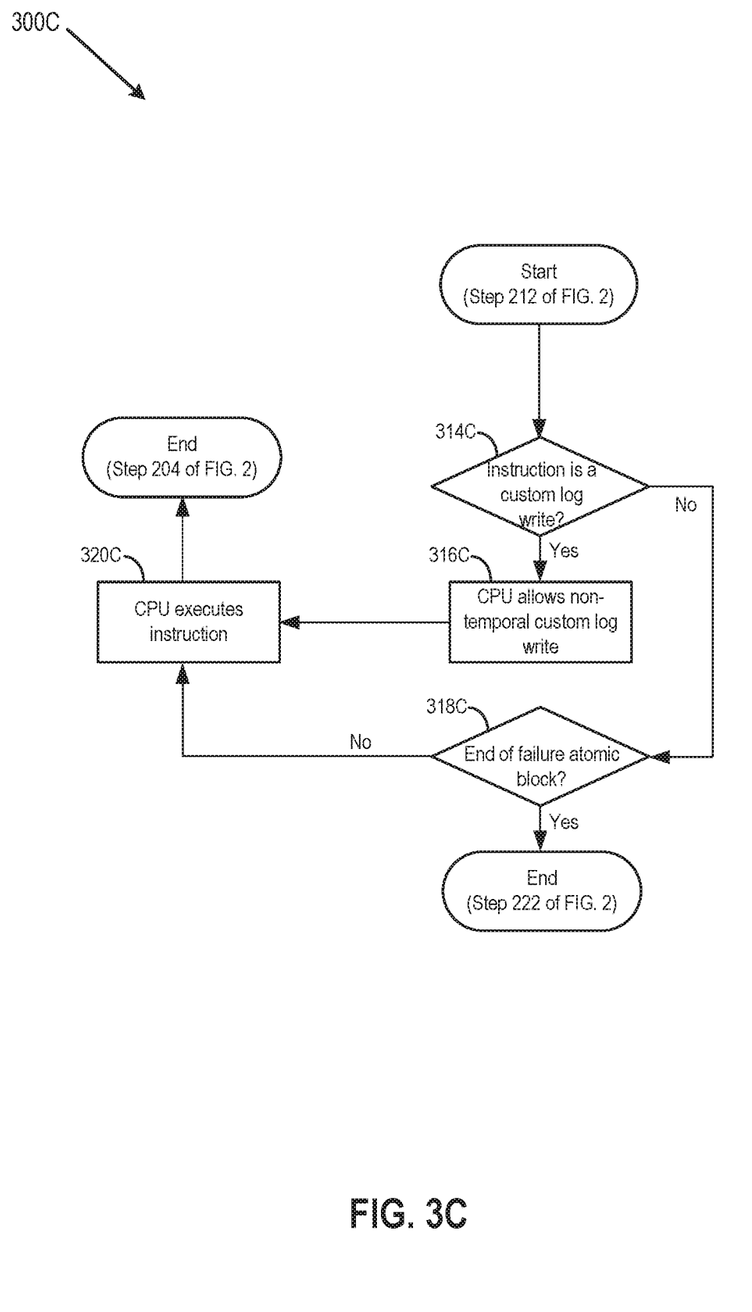
FIG. 3C is a flow diagram a depicting method of processing a non-terminating instruction within a failure atomic code block, in a third embodiment.
Figure 3D:
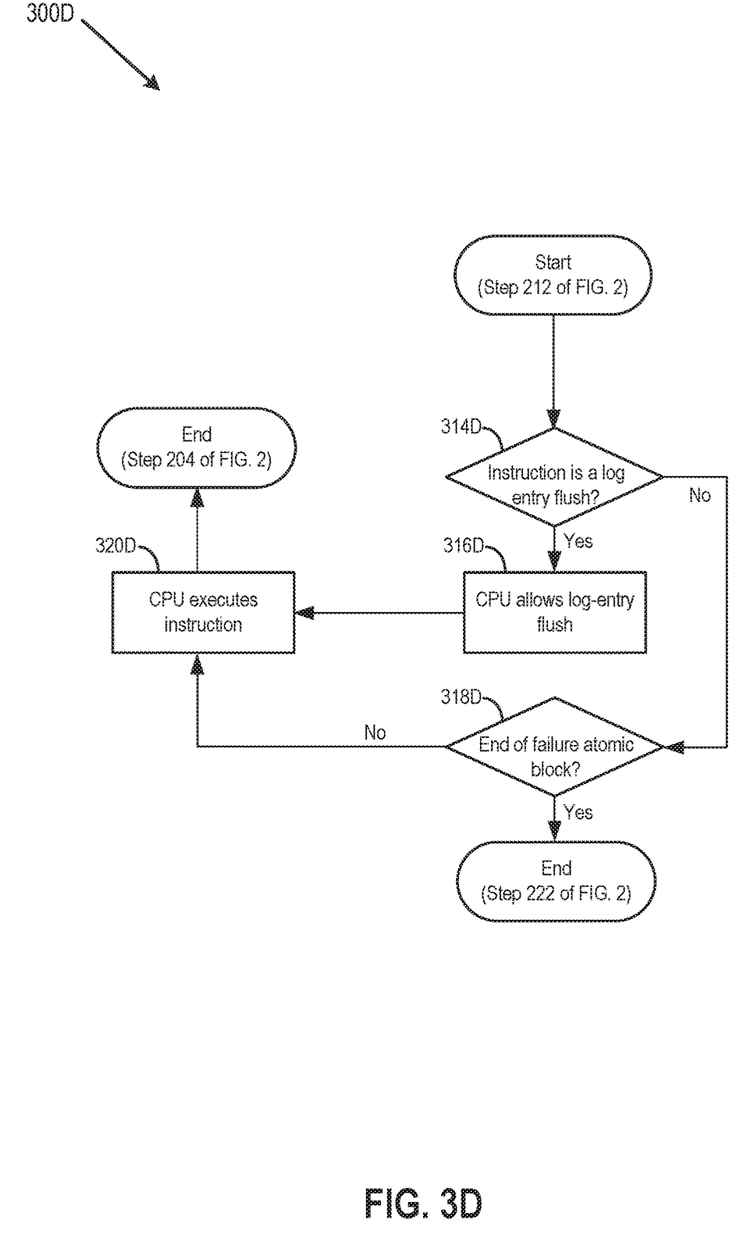
FIG. 3D is a flow diagram a depicting method of processing a non-terminating instruction within a failure atomic code block, in a fourth embodiment.

FIG. 3B is a flow diagram depicting method 300B, which is an alternative to the methods depicted in FIGS. 3A, 3C, and 3D. Method 300B is an embodiment of processing a non-terminating instruction within a failure atomic code section. Method 300B of FIG. 3B assumes that the hardware of CPU 102 is configured to recognize all write (or store) instructions within a failure atomic code section, and then to automatically make a non-temporal log write for the data being modified. As indicated above, the log write would include the memory address of data being modified, as well as the new or old value of the data, depending on whether an undo or redo log is implemented. The log write is directly to NVM 112, bypassing L1 cache 106, L2 cache 108, L3 cache 110, and any other cache that may be present in the cache-memory hierarchy.

At block 314B of method 300B, CPU 102 analyzes the instruction to determine whether the instruction is a write instruction. If so, method 300B continues to block 316B. If the instruction is not a write instruction, then method 300B continues to block 318B.

At block 316B, CPU 102 automatically creates a non-temporal log entry within NVM 112 for the memory address being modified by the instruction from block 204 of FIG. 2. This works to ensure consistency of the system. In block 320B, the write instruction is executed, and the data is modified within the cache (e.g., L1 cache 106). After block 320B, method 200 returns to block 204 of FIG. 2.

At block 318B, method 300A determines whether the instruction is an instruction indicating the end of a failure atomic code section, such as an instruction analogous to an "xend" instruction of x86 ISA. If the instruction is not an instruction indicating the end of the failure atomic code section, then method 300B continues to block 320B, where the instruction is executed as usual, and method 200 returns to block 204 of FIG. 2. If the instruction is an instruction indicating the end of the failure atomic code section, then method 300B continues to block 222 of FIG. 2, where blocks 222 and 224 close out the failure atomic code section, as further described below.

FIG. 3C is a flow diagram depicting method 300C, which is an alternative to the methods depicted in FIGS. 3A, 3B, and 3D. Method 300C is an embodiment of processing a non-terminating instruction within a failure atomic code section. Method 300C of FIG. 3C assumes that the hardware of CPU 102 is configured to allow execution of a custom ISA instruction, such as "pwritent," which is similar to Intel's x86 instruction "writent." The custom ISA instruction, pwritent, would be coded to make a non-temporal write directly to NVM 112, bypassing caches 106, 108, 110. Method 300C is similar to that of 300A depicted in FIG. 3A, but method 300C is programmer-controlled, allowing more flexibility than the entirely hardware controlled and managed method 300A of FIG. 3A. The custom write instruction would only be used by the programmer to make non-temporal log entry writes, so the custom write instruction may be coded specifically to only allow log writes as opposed to any writes.

At block 314C of method 300C, CPU 102 analyzes the instruction to determine whether it is a custom log write instruction that CPU 102 is configured to recognize and allow. If so, method 300C continues to block 316C. If the instruction is not an allowable custom log write instruction recognized by CPU 102, then method 300C continues to block 318C.

At block 316C, CPU 102 allows non-temporal custom log write instruction, as opposed to aborting when the cache (e.g., L1 cache 106) is bypassed. In block 320C, the custom log write instruction is executed, and the log is modified within NVM 112. After block 320C, method 200 returns to block 204 of FIG. 2.

At block 318C, method 300C determines whether the instruction is an instruction indicating the end of a failure atomic code section, such as an instruction analogous to an "xend" instruction of x86 ISA. If the instruction is not an instruction indicating the end of the failure atomic code section, then method 300C continues to block 320C, where the instruction is executed as usual, and method 200 returns to block 204 of FIG. 2. If the instruction is an instruction indicating the end of the failure atomic code section, then method 300C continues to block 222 of FIG. 2, where blocks 222 and 224 close out the failure atomic code section, as further described below.

FIG. 3D is a flow diagram depicting method 300D, which is an alternative to the methods depicted in FIGS. 3A, 3B, and 3C. Method 300D is an embodiment of processing a non-terminating instruction within a failure atomic code section. Method 300D assumes that the hardware of CPU 102 is configured to allow flushing of log entries within a failure atomic code section. Usually, HTM processors are configured such that flushing a transactional cache line from the cache (e.g., L1 cache 106) during execution of a transaction causes that transaction to abort. But here, CPU 102 is configured to allow flushing of a cache line that contains log entry data. Mechanisms to identify log entry flushes from non-log entry flushes are known in the art and are described in Avni H., Levy E., Mendelson A. (2015) Hardware Transactions in Nonvolatile Memory. In: Moses Y. (eds) Distributed Computing. Lecture Notes in Computer Science, vol 9363. Springer, Berlin, Heidelberg.

At block 314D of method 300D, CPU 102 analyzes the instruction to determine whether it is a flush of a log entry. If so, method 300D continues to block 316D. If the instruction is not a log flush instruction, then method 300D continues to block 318D.

At block 316D, CPU 102 allows the flush-of-a-log-entry instruction, as opposed to aborting when a cache line is flushed during a HTM transaction. In block 320D, the log flush instruction is executed, and the log is modified within NVM 112. After block 320D, method 200 returns to block 204 of FIG. 2.

At block 318D, method 300D determines whether the instruction is an instruction indicating the end of a failure atomic code section, such as an instruction analogous to an "xend" instruction of x86 ISA. If the instruction is not an instruction indicating the end of the failure atomic code section, then method 300D continues to block 320D, where the instruction is executed as usual, and method 200 returns to block 204 of FIG. 2. If the instruction is an instruction indicating the end of the failure atomic code section, then method 300D continues to block 222 of FIG. 2, where blocks 222 and 224 close out the failure atomic code section, as further described below.

Block 222 of FIG. 2 is reached if the instruction from block 204 is an instruction indicating the end of a failure atomic code section. Such an instruction may be, for example, a ptxend instruction, which is analogous to an xend instruction of Intel's x86 ISA. Because a failure atomic code section is an HTM transaction with custom rules (as described with reference to FIGS. 3A, 3B, 3C, and 3D) that was started with a custom start instruction (see discussion of block 202 above), the termination instruction of a failure atomic section is also a custom instruction.

At block 222, the custom terminating instruction causes CPU 102 to mark transactional cache line(s) as non-transactional, freeing them for modification by other threads without risk of a potential data conflict. Cache line(s) may be marked non-transactional by changing a transaction bit within the cache line(s) from a one to a zero.

At block 224, the custom terminating instruction also causes CPU 102 to write a non-temporal COMMIT flag to the log, indicating within the log that all log entries for the transaction were persistently logged within NVM 112, and that the log entries for the transaction reflect a complete consistent state of the system, being usable to "undo" or "redo" a transaction in the occurrence of a power failure. Optionally, CPU 102 may be further modified in methods 300A, 300B, 300C, and 300D to allow non-temporal COMMIT flag writes during a transaction, giving a programmer the option of writing a persistent COMMIT flag to NVM 112 before the end of a transaction, but after all log entries of the transaction have been persistently written to NVM 112. The COMMIT flag may be implemented by various data structures, such as by a timestamp. This would allow ascertaining order of committed transaction, if needed, such as if conflicting transactions occurred. Alternative to a timestamp, a counter shared between threads may be utilized, such as a volatile shared counter. All memory operations in a successfully completed HTM transaction appear to other threads to execute atomically. In a preferred embodiment, blocks 222 and 224 are performed atomically by the HTM system of CPU 102, meaning that either both blocks 222 and 224 are performed, or neither block is performed.

It is important to note that after a terminating instruction that terminates a failure atomic code section within an HTM transaction, cache lines that had been marked as transactional during the transaction of method 200 are not necessarily flushed to NVM 112 during execution of method 200 or soon thereafter. Timing of cache line flushing to NVM 112 is dictated by the caching policy implemented on computing device 100. For example, such policies include "write-back" and "write-through" policies, which are known in the art. This means that after method 200 ends, the system pertaining to the transaction of method 200 is not necessarily in a consistent state within NVM 112. However, the persistent log entries logged to NVM 112 during the transaction of method 200 ensure that the system pertaining to the transaction of method 200 can be restored to a consistent state after a power failure. This can be done by accessing the persistent log entries made to NVM 112 during method 200.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of atomically executing computer instructions by a central processing unit (CPU) of a computing device comprising non-volatile memory, the CPU configured to implement hardware transactional memory (HTM), the method comprising:
reading an instruction within a section of code designated as an HTM transaction;
copying at least one cache line from the non-volatile memory into a cache of the CPU, based on the instruction;
marking the copied at least one cache line as transactional;
creating a persistent log within the non-volatile memory, based on the instruction, by at least one of:
(1) based on the instruction being a log write instruction, converting the instruction to a non-temporal log write instruction, and executing the non-temporal log write instruction;
(2) based on the instruction being a write instruction, executing a non-temporal log write for data modified by the write instruction;
(3) based on the instruction being a custom log write instruction, executing a non-temporal write of a log entry; or
(4) based on the instruction being a log entry flush instruction, executing the log entry flush instruction; and
unmarking the copied at least one cache line from transactional, to non-transactional.

2. The method of claim 1, wherein creating the persistent log comprises: based on the instruction being a log write instruction, converting the instruction to the non-temporal log write instruction, and executing the non-temporal log write instruction.

3. The method of claim 1, wherein creating the persistent log comprises: based on the instruction being a write instruction, executing the non-temporal log write for data modified by the write instruction.

4. The method of claim 1, wherein creating the persistent log comprises: based on the instruction being a custom log write instruction, executing the non-temporal write of a log entry.

5. The method of claim 1, wherein creating the persistent log comprises: based on the instruction being a log entry flush instruction, executing the log entry flush instruction.

6. The method of claim 1, wherein the cache is a private cache to the CPU such that the cache is inaccessible to other CPUs of the computing device.

7. The method of claim 1, wherein subsequent to the unmarking, the CPU writes a COMMIT flag to the persistent log indicating to a recovery module that all log entries within the HTM transaction required to maintain consistency have been recorded to the non-volatile memory.

8. A non-transitory computer-readable storage medium comprising instructions, which when executed by a computing device, causes the computing device to carry out operations for atomically executing computer instructions by a central processing unit (CPU) of the computing device comprising non-volatile memory, the CPU configured to implement hardware transactional memory (HTM), comprising:
reading an instruction within a section of code designated as an HTM transaction;
copying at least one cache line from the non-volatile memory into a cache of the CPU, based on the instruction;
marking the copied at least one cache line as transactional;
creating a persistent log within the non-volatile memory, based on the instruction, by at least one of:
(1) based on the instruction being a log write instruction, converting the instruction to a non-temporal log write instruction, and executing the non-temporal log write instruction;
(2) based on the instruction being a write instruction, executing a non-temporal log write for data modified by the write instruction;
(3) based on the instruction being a custom log write instruction, executing a non-temporal write of a log entry; or
(4) based on the instruction being a log entry flush instruction, executing the log entry flush instruction; and
unmarking the copied at least one cache line from transactional, to non-transactional.

9. The non-transitory computer-readable storage medium of claim 8, wherein creating the persistent log comprises: based on the instruction being a log write instruction, converting the instruction to the non-temporal log write instruction, and executing the non-temporal log write instruction.

10. The non-transitory computer-readable storage medium of claim 8, wherein creating the persistent log comprises: based on the instruction being a write instruction, executing the non-temporal log write for data modified by the write instruction.

11. The non-transitory computer-readable storage medium of claim 8, wherein creating the persistent log comprises: based on the instruction being a custom log write instruction, executing the non-temporal write of a log entry.

12. The non-transitory computer-readable storage medium of claim 8, wherein creating the persistent log comprises: based on the instruction being a log entry flush instruction, executing the log entry flush instruction.

13. The non-transitory computer-readable storage medium of claim 8, wherein the cache is a private cache to the CPU such that the cache is inaccessible to other CPUs of the computing device.

14. The non-transitory computer-readable storage medium of claim 8, wherein subsequent to the unmarking, the CPU writes a COMMIT flag to the persistent log indicating to a recovery module that all log entries within the HTM transaction required to maintain consistency have been recorded to the non-volatile memory.

15. A computing device, comprising:
a CPU configured to implement hardware transactional memory (HTM);
a non-volatile memory;
a cache of the CPU;
wherein the computing device is configured to:
read an instruction within a section of code designated as an HTM transaction;
copy at least one cache line from the non-volatile memory into the cache, based on the instruction;
mark the copied at least one cache line as transactional;
create a persistent log within the non-volatile memory, based on the instruction, by at least one of:
(1) based on the instruction being a log write instruction, converting the instruction to a non-temporal log write instruction, and executing the non-temporal log write instruction;
(2) based on the instruction being a write instruction, executing a non-temporal log write for data modified by the write instruction;

(3) based on the instruction being a custom log write instruction, executing a non-temporal write of a log entry; or (4) based on the instruction being a log entry flush instruction, executing the log entry flush instruction; and unmark the copied at least one cache line from transactional, to non-transactional.

16. The computing device of claim 15, wherein creating the persistent log comprises: based on the instruction being a log write instruction, converting the instruction to the non-temporal log write instruction, and executing the non-temporal log write instruction.

17. The computing device of claim 15, wherein creating the persistent log comprises: based on the instruction being a write instruction, executing the non-temporal log write for data modified by the write instruction.

18. The computing device of claim 15, wherein creating the persistent log comprises: based on the instruction being a custom log write instruction, executing the non-temporal write of a log entry.

19. The computing device of claim 15, wherein creating the persistent log comprises: based on the instruction being a log entry flush instruction, executing the log entry flush instruction.

20. The computing device of claim 15, wherein the cache is a private cache to the CPU such that the cache is inaccessible to other CPUs of the computing device.

* * * * *